Nov. 26, 1968    T. M. CORRY    3,413,493
TRIGGERING CIRCUIT FOR A CONTROLLED RECTIFIER
Filed May 20, 1965

INVENTOR.
THOMAS M. CORRY
BY C. R. Meland
HIS ATTORNEY

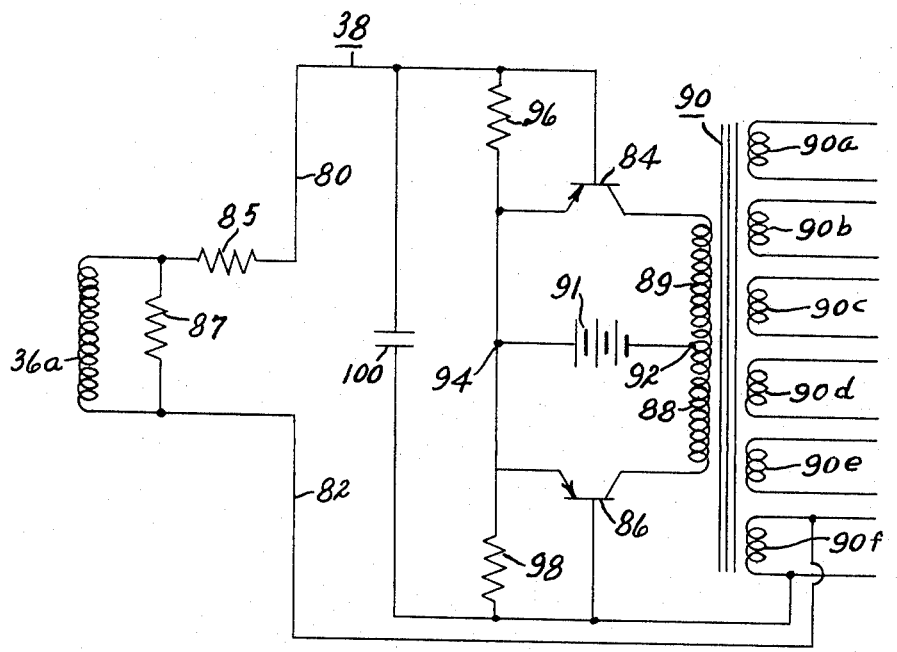
Fig. 3
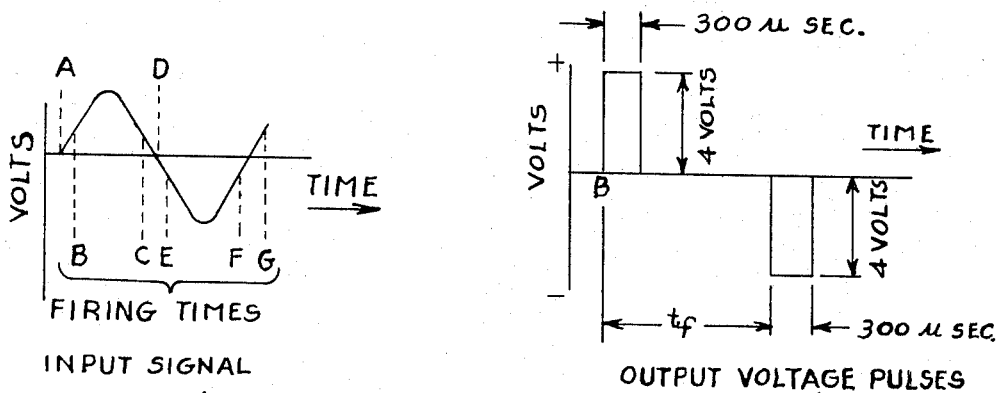
Fig. 3A
INPUT SIGNAL
Fig. 3B
OUTPUT VOLTAGE PULSES
INVENTOR.
THOMAS M. CORRY
BY C. R. Meland
HIS ATTORNEY INVENTOR.
THOMAS M. CORRY
BY C. R. Meland
HIS ATTORNEY United States Patent Office 3,413,493
Patented Nov. 26, 1968

3,413,493
TRIGGERING CIRCUIT FOR A CONTROLLED
RECTIFIER
Thomas M. Corry, Goleta, Calif., assignor to General
Motors Corporation, Detroit, Mich., a corporation of
Delaware
Filed May 20, 1965, Ser. No. 457,329
6 Claims. (Cl. 307—252)

ABSTRACT OF THE DISCLOSURE

This invention relates to a power supply system for an induction motor which is fed from a source of direct current through an inverter. The inverter includes a plurality of controlled rectifiers and the system includes means for triggering the controlled rectifiers to control the output frequency of the inverter. The system includes a circuit for gating a controlled rectifier on by the discharge of a capacitor and a circuit which maintains a forward bias on the controlled rectifier after the capacitor has discharged.

---

This invention relates to a power supply system for an electric motor where the electric motor is fed from a source of direct curent by means of an inverter.

One of the objects of this invention is to provide a motor power supply system that includes an inverter and which includes an improved signal pick-up, pulse shaper and controlled rectifier driver circuit for the controlled rectifiers of the inverter.

Another object of this invention is to provide an electric circuit which is capable of translating shaft position into a plurality of electrical signals and where the output frequency of the electric circuit depends upon the frequency of rotation of the shaft.

Still another object of this invention is to provide an improved trigger circuit for triggering controlled rectifiers which is capable of applying extremely fast rise current pulses to the gate of the controlled rectifier. This circuit is useful in motor control systems where the motor is supplied through a controlled rectifier inverter.

Still another object of this invention is to provide a fast rise trigger, latching and reverse bias circuit for a controlled rectifier inverter. In carrying this object forward, the inverter may be used to supply a three-phase induction motor and the circuit is arranged such that the controlled rectifier is maintained in a conductive condition by a latching circuit over a predetermined conduction angle. This is important where the inverter is fed from a source of direct current through a modulator of a pulse type since where the inverter is fed by pulses of direct current, there is the possibility of a controlled rectifier turning off when the direct current goes to zero and the latching circuit of this invention prevents this by holding the controlled rectifier on for the required conduction angle.

Still another object of this invention is to provide a controlled rectifier inverter which includes power controlled rectifiers and shut-off controlled rectifiers and where the power supply and shut-off controlled rectifiers have triggering signals applied to them from fast rise trigger circuits.

A further object of this invention is to provide an electrical system where the load is powered by an inverter and where the inverter includes power and shut-off controlled rectifiers and further where the power controlled rectifiers are triggered by a fast rise trigger latching and reverse bias circuit. With this arrangement, the contolled rectifier inverter is capable of supplying voltage pulses of predetermined angles to an electrical load even though the inverter is fed from a source of direct current through a pulse modulator.

Further objects and advantages of the present invention will be apparent from the following description, reference being had to the accompanying drawings wherein preferred embodiments of the present invention are clearly shown.

In the drawings:

FIGURE 3 is a schematic circuit diagram of a slow rise trigger circuit for supplying control signals to fast rise trigger circuits.

FIGURE 3A is a curve illustrating the output voltage waveform applied to the circuit of FIGURE 3.

FIGURE 3B is a curve of the output voltage of the circuit shown in FIGURE 3.

Figure 1:
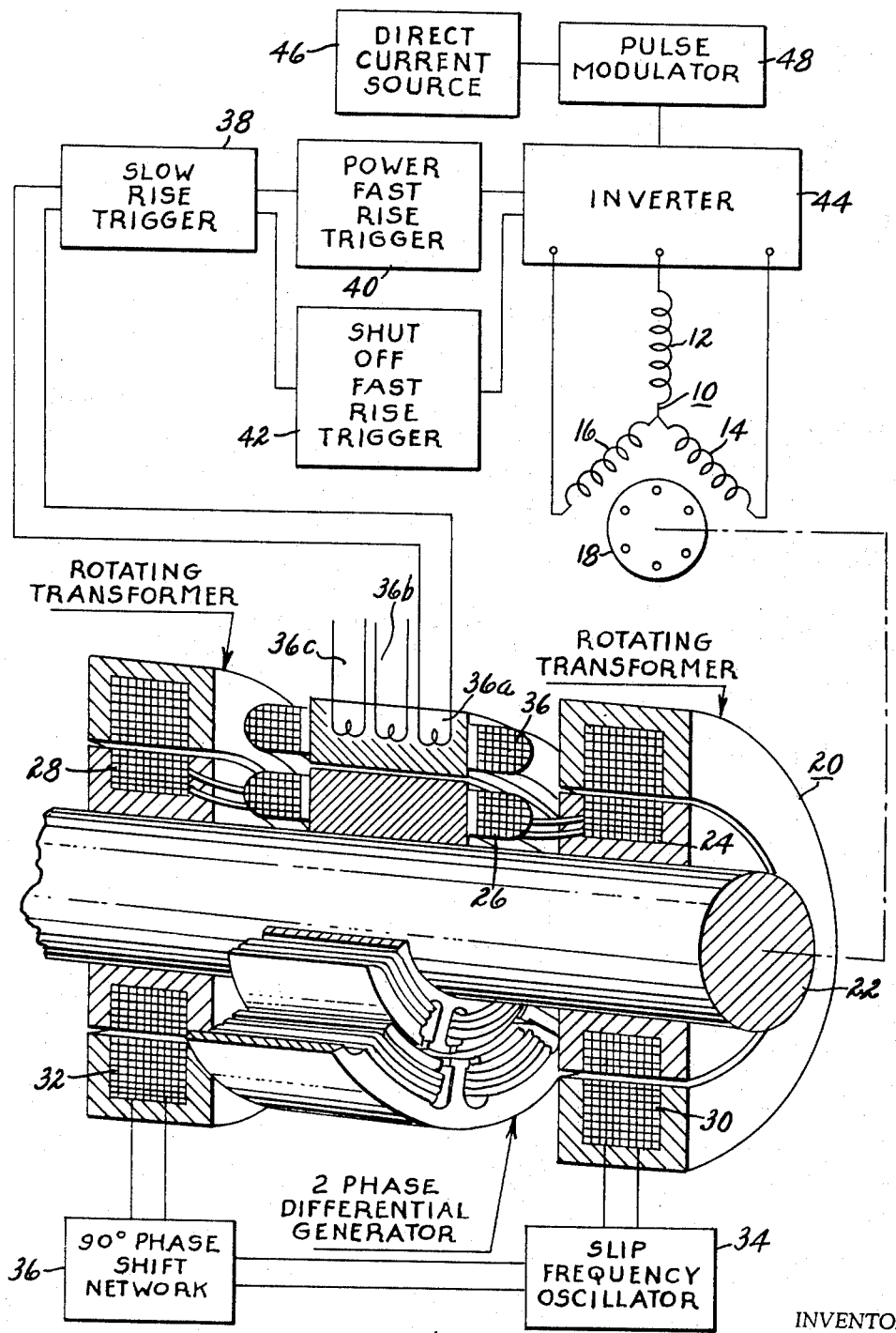
FIGURE 1 is a schematic circuit diagram of a motor control system made in accordance with this invention and illustrating in block diagram form the various circuits that make up the total electrical system.

Referring now to the drawings and more particularly to FIGURE 1, an electrical system is disclosed in block diagram form for feeding a three-phase induction motor generally designated by reference numeral 10. This motor includes a three-phase Y-connected stator winding formed of phase windings 12, 14 and 16. The motor has a squirrel cage rotor 18 which is used to drive some device such as a motor vehicle. The motor drives a control device generally designated by reference numeral 20 and having a shaft 22 coupled with the motor shaft. The shaft 22 carries windings 24, 26 and 28 the winding 26 being electrically connected with windings 24 and 28. The windings 24 and 28 rotate within fixed windings 30 and 32. The winding 30 is fed by a slip frequency oscillator 34 while the winding 32 is fed from the same slip frequency oscillator through a 90° phase shift network 36. The slip frequency oscillator can take various forms and supplies an input signal to windings 30 and 32 of a predetermined frequency. It is important that the frequency of the signal that is supplied to windings 30 and 32 be adjustable since it is possible to adjust the slip of the motor control system by adjusting the output frequency of the oscillator 34.

The winding 26 rotates within a winding 36 which includes three windings located 120 electrical degrees from each other. For convenience of illustration, the winding 36 is illustrated schematically as windings 36a, 36b and 36c, it being understood that the voltages induced in these windings are 120° out of phase.

It will be appreciated that the control device 20 will produce an output signal in the output windings 36a through 36c, the frequency of which is a summation of shaft speed and the output frequency of the slip frequency oscillator 34. Thus if the shaft speed has a frequency $F_a$ and the output frequency of the slip frequency oscillator is $F_b$, the frequency produced in each of the windings 36a through 36b will be $F_a$ plus $F_b$. The control device 20 may be thought of as a two-phase differential generator having a two-phase winding 26 and where a three-phase output is taken from the windings 36a through 36b. The voltage developed in any given output winding is an alternating voltage the frequency of which is a summation of shaft speed and the output frequency of the slip frequency oscillator.

The windings 36a through 36c are each connected with a slow rise trigger circuit, one of which is illustrated in FIGURE 1 and designated by reference numeral 38. It will be appreciated that three slow rise trigger circuits are required but for convenience of illustration, only one slow rise trigger circuit is illustrated.

The slow rise trigger circuit 38 feeds a power fast rise trigger circuit 40 and a shut-off fast rise trigger circuit 42. The trigger circuits 40 and 42 control a controlled rectifier inverter 44 which controls the application of power to the phase windings 12, 14 and 16 of the induction motor 10. The inverter 44 is fed from a source of direct current 46 through a pulse modulator 48 that is capable of supplying unidirectional variable width square wave pulses to the inverter.

Figure 2:
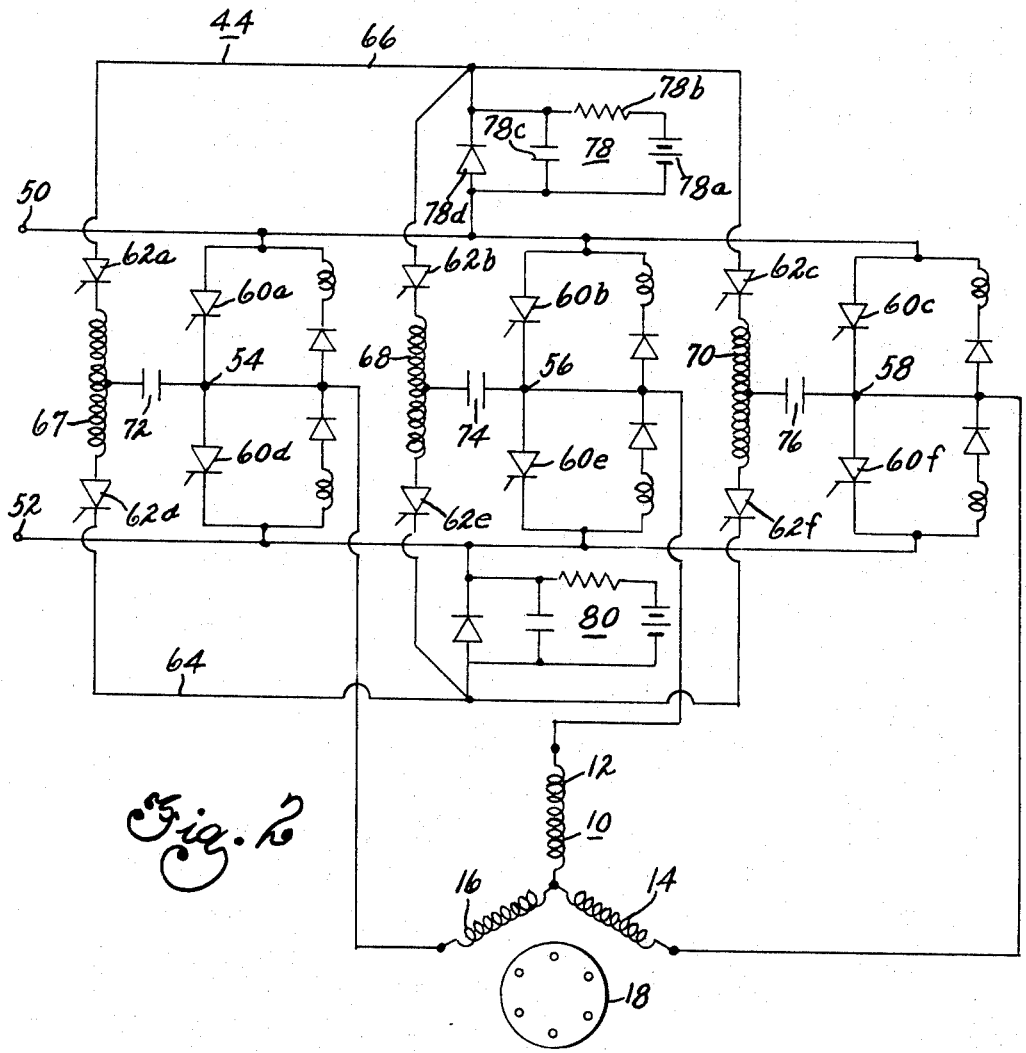
FIGURE 2 is a schematic circuit diagram of an inverter for supplying an electrical load such as a three-phase motor.

Referring now more particularly to FIGURE 2, a schematic circuit diagram of the inverter 44 is illustrated. This inverter has a pair of input terminals 50 and 52 which are fed by the pulse modulator 48. The modulator 48 can be of a type disclosed in patent application S.N. 457,374, filed on May 20, 1965 and now abandoned. Thus, the input terminals 50 and 52 will be supplied with pulsating direct current of a value determined by the pulse modulator 48. The inverter 44 has output terminals 54, 56 and 58. These output terminals are connected respectively with the three phase Y-connected stator winding of the motor 10 as is shown in FIGURE 2.

The inverter has six controlled rectifiers which can be called the power controlled rectifiers since they control the current flow through the phase windings of the three phase stator winding of the motor. These controlled rectifiers are designated by reference numbers 60a, 60b, 60c, 60d, 60e and 60f. The inverter also includes six shut-off controlled rectifiers 62a, 62b, 62c, 62d, 62e and 62f. The anodes of the shut-off controlled rectifiers 62d, 62e and 62f are connected with a common conductor 64. The cathodes of controlled rectifiers 62a, 62b and 62c are connected with a common conductor 66. It is seen that the shut-off controlled rectifiers are connected in series across conductors 66 and 64 and in series with the inductances 67, 68 and 70. The inverter has three shut-off capacitors 72, 74 and 76 connected respectively between junctions 54, 56 and 58 and a respective inductance.

The inverter includes shut-off power supplies designated respectively by reference numerals 78 and 80. Both of the shut-off power supplies are the same and therefore only one of them will be described. The shut-off supply 78 includes a source of direct current 78a, a resistor 78b, a capacitor 78c and a diode 78d. The diode is connected between common conductor 66 and a conductor connected with input terminal 50.

The operation of the inverter is such that pairs of power controlled rectifiers are turned on in a predetermined sequence to energize pairs of phase windings of the motor 10. Thus the sequence can be such that controlled rectifiers 60b and 60d are turned on simultaneously during one part of the cycle and with this arrangement, the phase windings 12 and 16 will be energized assuming that the input conductor 50 is positive. In another part of the cycle, for example, when controlled rectifiers 60a and 60e are turned on, the current flow is reversed through the phase windings 12 and 16. The arrangement is such that an alternating square wave is applied to the three phase winding of the motor to provide a rotating field within the motor. This is more fully described in co-pending application Ser. No. 295,954, filed on July 18, 1963 and now Patent 3,323,032.

The capacitors 72, 74 and 76 are charged and discharged during the operation of the inverter 44 and when a shut-off controlled rectifier is fired, a given capacitor will discharge to reverse bias one of the power controlled rectifiers to turn it off. Thus, for example, when controlled rectifier 62a is fired during a predetermined part of the cycle, the capacitor 72 will discharge back biasing the controlled rectifier 60a to turn it off. This is more fully described in application S.N. 457,386, filed on May 20, 1965 and now Patent 3,354,370.

Referring now to FIGURE 3, a schematic circuit diagram of the slow rise trigger circuit 38 shown in FIGURE 1 is illustrated. The slow rise trigger circuit 38 is energized from one of the output windings 36a of the shaft and slip frequency control device 20. As was pointed out hereinbefore, three slow rise trigger circuits are required, but in the discussion to follow, only one of the slow rise trigger circuits will be described and this will be followed by a description of controlling only one of the six power controlled rectifiers and one of the six shut-off controlled rectifiers. The alternating current which is induced in winding 36a (see FIGURE 3A) is applied to conductors 80 and 82 through a resistor 85 and a resistor 87 that is connected across the output winding of the generator 20. The conductors 80 and 82 are connected with a transistor oscillator that includes the PNP transistors 84 and 86. The collectors of transistors 84 and 86 are connected to opposite ends of primary windings 88 and 89 of a transformer 90. A source of direct current 91 is connected between the tap 92 and a junction 94. The junction 94 is connected with the emitters of transistors 84 and 86 and is connected with lines 80 and 82 through resistors 96 and 98. A capacitor 100 connects the base of transistor 86 with conductor 80 and this conductor is connected with the base of transistor 84.

The transformer 90 has a plurality of secondary windings 90a, 90b, 90c, 90d, 90e and 90f. These secondary windings are connected with the power fast rise triggers 40 and shut-off fast rise triggers 42 in a manner to be more fully described. It is seen that the secondary winding 90f is connected between the base of transistor 86 and conductor 82.

The transformer 90 is a saturating transformer and the transistors 84 and 86 are connected in a push-pull configuration across the primary windings of the transformer. The conduction of the transistors is controlled by the input voltage coming from the winding 36a of the generator 20. The voltage developed across secondary winding 90f provides positive feed-back but the feed-back loop is designed not to permit free running oscillations.

The function of the capacitor 100 is to exponentially reduce transistor base current as one of the transistors passes from its current saturated mode to its current limiting mode of operation. This capacitor in conjunction with resistor 85 is also part of an integrating circuit that reduces spurious input voltage pulses and attenuates the input signal as the frequency of the voltage developed in coil 36a is increased. This high frequency attenuation is necessary because the amplitude of the generator output signal increases as motor speed increases. The RC network of capacitor 100 and resistor 85 tends to maintain a constant r.m.s. signal current through the transistor bases regardless of motor shaft speed.

The operation of the slow rise trigger circuit illustrated in FIGURE 3 will now be described with reference to the curves shown in FIGURES 3A and 3B. The input voltage from winding 36a is depicted in FIGURE 3A while the output voltage of the secondary windings of transformer 90 is depicted in FIGURE 3B. When the input signal voltage of FIGURE 3A is at point A, the generator output signal (winding 36a) is changing polarity. This reversal in current resets the core of transformer 90 and causes transistor 84 to turn on and transistor 86 to turn off. The instant the transformer is reset and transistor 84 starts to conduct, positive feedback voltage appears across secondary winding 90f driving transistor 84 further into conduction and speeding the switching off action of transistor 86. When the output signal reaches point B of FIGURE 3A, transistor 84 is turned fully on and transistor 86 is turned fully off. Under this condition of operation, the voltage of battery 90 is impressed across the primary winding 89 and voltages are induced in the secondary windings of the transformer 90 as shown in FIGURE 3B.

When point C is reached in the curve of FIGURE 3A, the transistor 84 will remain switched on until the transformer saturates causing the output voltages of the secondary windings to drop to zero as shown in FIGURE 3B. At this instant, the operating mode of transistor 84 changes from current saturated to current limiting. The capacitor 100 now discharges through the base of transistor 84 allowing collector current of this transistor to fall exponentially rather than instantaneously thus preventing ringing across the transformer secondary windings. The input signal current also flows through the base of transistor 84 and maintains a low level of base current after the capacitor 100 completely discharges. Just prior to the instant the signal current reverses polarity (point D), the transformer is saturated and no voltages appear across the secondary windings of the transformer. Thus, the battery voltage is supported across the collector to emitter resistance of transistor 84 and transistor 86 is held in the blocking state and also supports the battery voltage.

When the input voltage reaches point D on curve 3A, the reversal of polarity of the input signal resets the transformer core and cuts off transistor 84 and drives transistor 86 fully conductive. The switching action is again regenerative due to the reversed feedback voltage from secondary winding 90f in series with the signal voltage.

When point E is reached on the input signal voltage curve of FIGURE 3A, a pulse of voltage of an opposite polarity is developed across the secondary windings as is depicted in FIGURE 3B. The length of this pulse is again determined by the time required for the transformer to saturate. Transistor 86 is then held in the conducting state by the discharge of capacitor 100 and the input signal current until the signal polarity is reversed causing transistor 84 to conduct again and the cycle repeats itself.

From the foregoing, it will be appreciated that direct current pulses of opposite polarity and constant amplitude as shown in FIGURE 3B are developed in the secondary windings of the transformer 90 as the input voltage varies in accordance with the curve of FIGURE 3A. The frequency of the output voltages is determined by the input frequency of the voltage appearing across winding 36a.

The voltages developed across the six secondary windings of the transformer 90 are used to trigger the power fast rise triggers 40 and the shut-off fast rise triggers 42. It is pointed out that there will be three circuits of the type shown in FIGURE 3 required and therefore there will be 18 secondary windings capable of applying control pulses to the triggers 40 and 42. These secondary windings must be connected with the triggers 40 and 42 in such a manner that the correct sequence is provided for firing the power controlled rectifiers and shut-off controlled rectifiers of the inverter 44. In this regard, it is to be noted that six power fast rise triggers 40 are required and six shut-off fast rise triggers 42 are required in order to properly sequence the inverter 44. In order to simplify the description of this invention, however, only one fast-rise trigger 40 will be described controlling only one power controlled rectifier and only one shut-off fast rise trigger 42 will be described for controlling one shut-off controlled rectifier.

Figure 5:
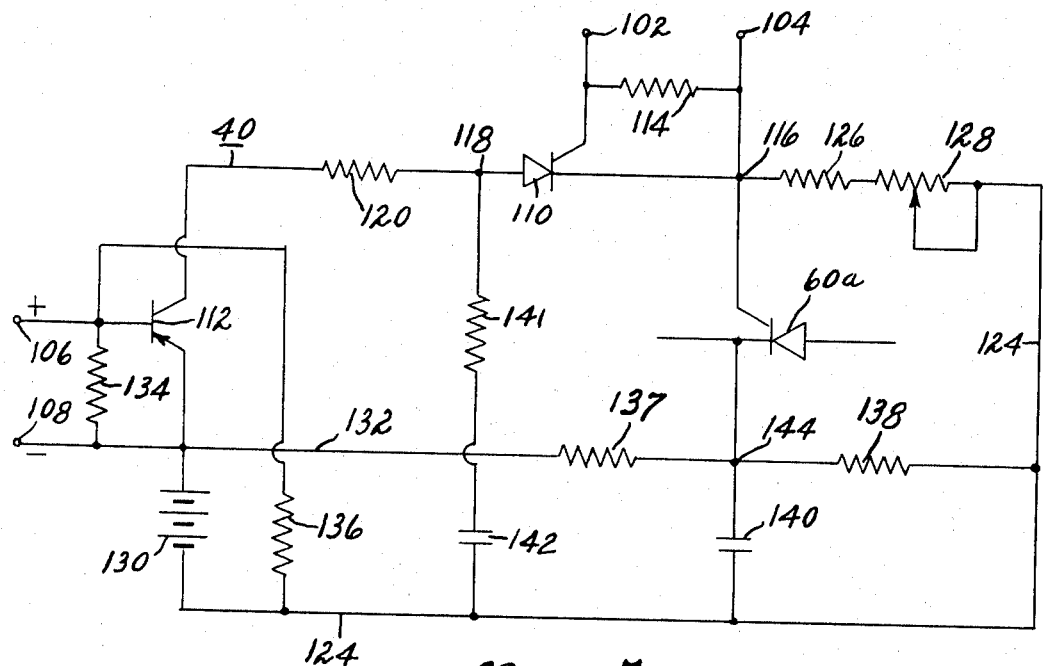
FIGURE 5 is a schematic circuit diagram of a fast rise trigger circuit for controlling the power controlled rectifiers of the inverter.

Referring now to FIGURE 5, one of the power fast rise trigger circuits 40 is illustrated. It is assumed that this trigger circuit is controlling the controlled rectifier 60a which will be connected in the inverter in a manner shown in FIGURE 2. The trigger circuit 40 includes input terminals 102 and 104 which provide a turn-on trigger supply for the controlled rectifier 60a. This circuit has two other input terminals 106 and 108 which receive a signal which is also supplied to the shut-off triggers 42. The terminals 102 and 104 and 106 and 108 will be connected with selected secondary windings of the transformer 90 and in the proper sequence to control the inverter 44.

The trigger circuit 40 includes a controlled rectifier 110 and a PNP transistor 112. The gate of controlled rectifier 110 is connected with input terminal 102 and a resistor 114 is connected across the input terminals 102 and 104. The cathode of controlled rectifier 110 is connected with junction 116 while the anode of controlled rectifier 110 is connected with junction 118. The junction 118 is connected with the collector of transistor 112 through resistor 120. The junction 116 is connected with power input conductor 124 through a fixed resistor 126 and an adjustable resistor 128. The conductor 124 is connected to one side of a source of direct current 130 the opposite side of this source being connected with conductor 132. The emitter of transistor 112 is connected with conductor 132 and a resistor 134 connects the emitter and base of transistor 112. A resistor 136 is connected between the base of transistor 112 and conductor 124. The emitter of transistor 112 is also connected with conductor 124 through resistors 137 and 138. A capacitor 140 is connected across resistor 138.

A series-connected resistor and capacitor 141 and 142 connect conductor 124 and the junction 118.

The cathode of controlled rectifier 60a which is one of the inverter power supply controlled rectifiers is connected with junction 144.

With no signal input to terminals 102 and 104, the controlled rectifier 60a is biased off. In this condition of operation, the transistor 112 is biased to a conductive condition since base current can flow in this transistor. When a signal of the proper polarity coming from one of the secondary windings of the transformer 90 is applied across input terminals 102 and 104, the controlled rectifier 110 will be biased to a conductive condition. When the controlled rectifier 110 turns on, the capacitor 142 will discharge through the gate of the controlled rectifier 60a turning this controlled rectifier on. After capacitor 152 discharges through controlled rectifier 110 and the gate-cathode circuit of controlled rectifier 60a, a sustaining current for holding controlled rectifier 60a on flows from direct current source 130, through the emitter-collector circuit of transistor 112, through resistor 120, through the trigger controlled rectifier 110 and then to the gate-cathode circuit of the power controlled rectifier 60a and resistor 138. It therefore is seen that as long as transistor 112 is conducting, the power controlled rectifier 60a will remain turned on and this is important where the power being supplied to this controlled rectifier across input terminals 50 and 52 of FIGURE 2 is of the pulsating direct current type as is supplied by a pulse modulator. Thus, if the controlled rectifier 60a were not latched on by the circuit including transistor 112 and if the system were supplied by a pulse modulator, the controlled rectifier 60a might turn off prematurely which is not desired in this system. By the use of this latching circuit, it is possible to hold the controlled rectifier 60a on for a full 120° conduction angle even though the inverter is being supplied by a pulse modulator.

As the output voltage of the secondary windings of transformer 90 varies, a signal eventually is applied across input terminals 106 and 108 of the trigger circuit in FIGURE 5 which will drive the base of transistor 112 positive with respect to its emitter. This will cause the transistor 112 to turn off in its emitter-collector circuit which turns off the trigger controlled rectifier 110 and the power controlled rectifier 60a. Thus when the transistor 112 turns off, the latching circuit for controlled rectifier 60a is broken and this controlled rectifier therefore turns off.

The above described sequence of events repeats itself over a given cycle of operation to hold controlled rectifier 60a on for a predetermined length of time as determined by the input signal voltage shown in FIGURE 3A. The controlled rectifier 60a remains on even when the output voltage of the pulse modulator goes to zero due to the provision of the latching circuit.

Figure 4:
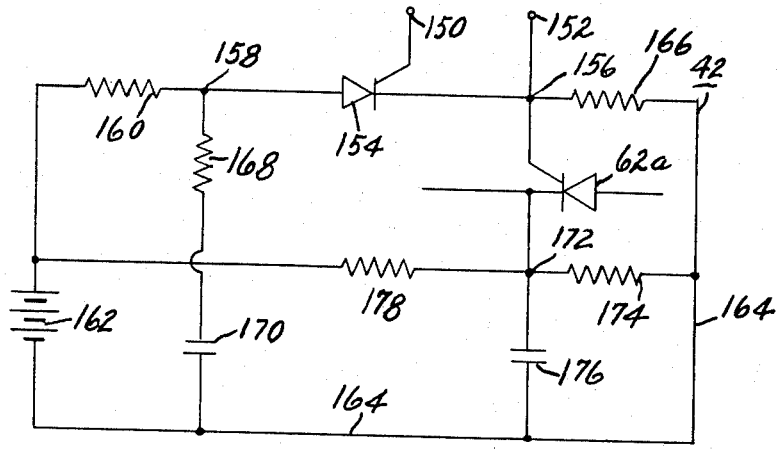
FIGURE 4 is a schematic circuit diagram of a fast rise trigger circuit for controlling the shut-off controlled rectifiers of the inverter that supplies the electrical load of the system shown in FIGURE 1.

The shut-off fast rise trigger circuit 42 is illustrated in FIGURE 4 and will now be described. This trigger circuit controls one of the shut-off controlled rectifiers, for example, controlled rectiger 62a. The trigger circuit of FIGURE 4 has input terminals 150 and 152 which are connected with one of the selected secondary windings of a transformer 90. The trigger circuit of FIGURE 4 includes a trigger controlled rectifier 154 having its gate connected with input terminal 150 and having its cathode connected with junction 156. The anode of controlled rectifier 154 is connected with junction 158. A resistor 160 is connected between junction 158 and one side of a source of direct current 162. The opposite side of the source of direct current is connected with conductor 164 and a resistor 166 is connected between this conductor and junction 156.

A series connected resistor and capacitor 168 and 170 are connected between junction 158 and conductor 164.

The gate of the shut-off controlled rectifier 62a is connected with junction 156 while its anode and cathode will be connected as shown in FIGURE 2. The cathode of controlled rectifier 62a is connected with junction 172 and a resistor 174 connects this junction with conductor 164. A capacitor 176 is connected across resistor 174 while a resistor 178 connects the positive side of the direct source 162 and junction 172.

In describing the operation of the trigger circuit shown in FIGURE 4, it will be appreciated that the controlled rectifier 154 is normally not conductive and that the controlled rectifier 62a is biased to a nonconductive condition. When a trigger pulse of the proper polarity is applied to input terminals 150 and 152 from one of the secondary windings of one of the transformers 90, the trigger controlled rectifier 154 is biased to a conductive condition. The capacitor 170 which was previously charged from direct current source 162 now discharges through the anode-cathode circuit of controlled rectifier 154 and through the gate cathode circuit of controlled rectifier 62a. This turns the controlled rectifier 62a on in its anode-cathode circuit to provide a discharge path for one of the capacitors in the inverter 44 to shut off one of the power controlled rectifiers. After capacitor 170 discharges, the resistor 160 functions to limit the current for the trigger controlled rectifier 154 below the holding current for this controlled rectifier to cause it to turn off and provides a charge path for capacitor 170 during the interval between pulses applied across input terminals 150 and 152.

The circuit of FIGURE 4 applies extremely fast rise current pulses to the gate of the controlled rectifier 62a thereby maximizing $di/dt$ capabilities of the controlled rectifier. The triggering circuit of FIGURE 4 also maintains a negative bias on the gate of the controlled rectifier 62a during the interval between trigger pulses applied to input terminals 150 and 152 thereby improving the $dv/dt$ capabilities of the device. In addition, the circuit of FIGURE 4 utilizes the holding current characteristics of the trigger controlled rectifier 154 to reset the trigger circuit.

The fast rise characteristic of the circuit of FIGURE 4 is important because it provides more uniform current density in the area immediately surrounding the gate connection of the controlled rectifier 62a during the in-rush of anode current and also reduces the turn-on power dissipation of the gate junction.

The capacitor 176 functions as a bypass capacitor. The resistor 174 and capacitor 176 could be replaced by a Zener diode if desired.

To summarize the operation of the electrical system that has been described, it will be appreciated that the power controlled rectifiers 62a through 62f of the inverter 44 are controlled in a predetermined sequence so that pairs of phase windings of the motor 10 are energized sequentially to provide a rotating magnetic field for the motor. The signal information for controlling the inverter is developed by the slow rise trigger circuit 38 which is shown in FIGURE 3 and which includes the secondary windings of the transformer 90. The signals developed by the slow rise trigger circuit 38 are selectively connected with the trigger circuits 40 and 42 to properly sequence the operation of the inverter.

With the system that has been described, fast rise trigger circuits are used for both the power controlled rectifiers and the shut-off controlled rectifiers of the inverter and a latching circuit is used in the trigger circuit 40 so that the system can operate efficiently where the inverter is fed by a pulse modulator.

Although fast rise trigger circuits have been disclosed for driving the inverter, the inverter can be driven directly from the slow rise trigger circuit where the inverter uses controlled rectifiers in which $di/dt$ and $dv/dt$ are not critical. In such an arrangement, each slow rise trigger circuit output transformer would require only four sets of trigger leads, that is, two for each power controlled rectifier and two for each shut-off controlled rectifier.

While the embodiments of the present invention as herein disclosed constitute a preferred form, it is to be understood that other forms might be adopted.

What is claimed is as follows:

1. An electrical system for controlling the conduction of a first power controlled rectifier comprising, first and second pairs of input terminals adapted to be connected with sources of control signals, a second controlled rectifier having an anode, cathode and gate, said second controlled rectifier having its anode-cathode circuit connected in series with the gate-cathode circuit of said first controlled rectifier, means connecting the gate and cathode of said second controlled rectifier respectively with said first pair of input terminals, a three terminal semiconductor switch having its current carrying terminals connected in series with the anode-cathode circuit of said first controlled rectifier, said semiconductor switch having its control terminal and one of its current carrying terminals connected respectively with said second pair of input terminals, a capacitor, a source of direct current, a first loop circuit including in a series connection said source of direct current, the current carrying terminals of said semiconductor switch and said capacitor, said capacitor being charged through said loop circuit when said semiconductor switch is baised to a conductive condition, a second loop circuit including in a series connection said capacitor, the anode-cathode circuit of second controlled rectifier and the gate-cathode circuit of said first controlled rectifier, said capacitor discharging through the anode-cathode circuit of said second controlled rectifier and the gate-cathode circuit of said first controlled rectifier to turn on said first controlled rectifier when signals are applied to said first input terminals to turn on said second controlled rectifier, said source of direct current, the current carrying terminals of said semiconductor switch, the anode-cathode circuit of said second controlled rectifier and the gate-cathode circuit of said first controlled rectifier connected in series whereby said source of direct current maintains said first controlled rectifier biased to a conductive condition once it is triggered to this condition by the discharge of said capacitor, said semiconductor switch operative to remove the forward bias on said first controlled rectifier when said semiconductor switch is biased nonconductive between its current carrying electrodes.

2. A triggering circuit for turning on a controlled rectifier having an anode, cathode and gate comprising, a source of direct current, a capacitor, means connecting said capacitor across said source of direct current whereby said capacitor is charged from said source of direct current, a second controlled rectifier having an anode, cathode and gate, means connecting the anode and cathode of said second controlled rectifier in series with said capacitor and in series with the gate-cathode circuit of said first controlled rectifier whereby said capacitor discharges through the anode-cathode circuit of said second controlled rectifier and the gate-cathode circuit of said first controlled rectifier to bias said first controlled rectifier to a conductive condition when said second controlled rectifier is gated conductive, a switching means connected in series between one terminal of said source of direct current and the anode-cathode circuit of said second controlled rectifier, said switching means when conductive connecting the terminals of said source of direct current across the gate-cathode circuit of said first controlled rectifier through the anode-cathode circuit of said second controlled rectifier to maintain a forward bias on said first controlled rectifier, said switching means when in a conductive condition forward biasing the anode-cathode circuit of said second controlled rectifier and the gate-cathode circuit of said first controlled rectifier from said source of direct current after said capacitor has discharged to trigger said first controlled rectifier to a conductive condition, and means for controlling the conduction of said second controlled rectifier and said switching device in a predetermined sequence.

3. An electric circuit for triggering a first controlled rectifier to a conduction condition and for maintaining it biased conductive for a predetermined length of time comprising, first and second pairs of input terminals adapted to be connected with said first and second control signals, a capacitor, a source of direct current, means connecting said capacitor with said source of direct current whereby said capacitor is charged from said source of direct current, a second controlled rectifier, a semiconductor switch, a circuit connected across the terminals of said capacitor including in a series connection the anode-cathode circuit of said second controlled rectifier and the gate-cathode circuit of said first controlled rectifier, said capacitor applying a forward bias to the anode-cathode circuit of said first controlled rectifier to turn it on when said second controlled rectifier is biased conductive in its anode-cathode circuit, means connecting said semiconductor switch in series with said source of direct current and in series with the anode-cathode circuit of said second controlled rectifier and the gate-cathode circuit of said first controlled rectifier, said semiconductor switch when conductive connecting the positive terminal of said source of direct current with the gate of said second controlled rectifier through the anode-cathode circuit of said second controlled rectifier to thereby maintain said second controlled rectifier conductive and maintain a forward bias on the gate-cathode circuit of said first controlled rectifier, means connecting the gate and cathode of said second controlled rectifier with said first input terminals, and means connecting said semiconductor switch with said second input terminals.

4. An electrical system for gating a controlled rectifier to a conductive condition and for maintaining a forward bias on said controlled rectifier comprising, a source of direct current, a capacitor, a circuit connecting said capacitor with said source of direct current whereby said capacitor is charged from said source of direct current, a circuit connecting opposite terminals of said capacitor with the gate and cathode of said controlled rectifier including the current carrying terminals of a switching device, said circuit when closed by said switching device connecting said charged capacitor in series with the gate-cathode circuit of said controlled rectifier to thereby apply a forward bias to the gate-cathode circuit of said controlled rectifier, means connecting said switching device in series with said source of direct current and in series with the gate-cathode circuit of said controlled rectifier, said source of direct current being poled such that its positive terminal is connected to the gate of said controlled rectifier through said switching device when said switching device is closed and poled such that the cathode of said controlled rectifier is connected with the negative side of said source whereby a forward bias is maintained on said controlled rectifier when said switching device is closed, and means for connecting and disconnecting said source of direct current to and from said switching device and gate of said controlled rectifier whereby said controlled rectifier can be turned off when said means is operative to disconnect said source of direct current from said switching device.

5. A triggering circuit for triggering a first controlled rectifier to a conductive condtion and then reverse biasing said first controlled rectifier comprising, a source of direct current, a capacitor, means connecting said capacitor across said source of direct current whereby said capacitor is charged from said source of direct current, a second controlled rectifier, a series circuit connected across opposite sides of said capacitor including the anode-cathode circuit of said second controlled rectifier and the gate-cathode circuit of said first controlled rectifier, said capacitor discharging to forward bias said first controlled rectifier in its gate-cathode circuit when said second controlled rectifier is gated conductive, means connecting opposite ends of said source of direct current with the gate and cathode of said first controlled rectifier in such a manner that said first controlled rectifier is biased nonconductive by said source of direct current after said capacitor has discharged to turn on said first controlled rectifier, and means for periodically applying a signal to the gate and cathode of said second controlled rectifier to turn it on.

6. The triggering circuit according to claim 5 where a resistor is connected in series with said source of direct current and the anode-cathode circuit of said second controlled rectifier to reduce the anode-cathode current of said second controlled rectifier below its holding value after said capacitor discharges to turn on said first controlled rectifier.

References Cited
UNITED STATES PATENTS
3,315,130    4/1967    Carter _____ 307—284

OTHER REFERENCES
G. E. Controlled Rectifier Manual: by G. E. pp. 164 and 165. Copyright 1960.

JOHN S. HEYMAN, *Primary Examiner.*